United States Patent [19]

Yamazaki et al.

[11] Patent Number: 4,614,904
[45] Date of Patent: Sep. 30, 1986

[54] CAPACITOR-RUN DRY TYPE SUBMERSIBLE MOTOR ASSEMBLY WITH A BUILT-IN STARTING CAPACITOR

[75] Inventors: Shigeru Yamazaki; Kazuo Nirasawa; Sinji Nishimori, all of Kanagawa, Japan

[73] Assignee: Ebara Corporation, Tokyo, Japan

[21] Appl. No.: 651,774

[22] Filed: Sep. 18, 1984

[30] Foreign Application Priority Data

Sep. 30, 1983 [JP] Japan ................................ 58-153082

[51] Int. Cl.$^4$ ............................................. H02P 1/44
[52] U.S. Cl. .................................... 318/793; 318/794; 310/87
[58] Field of Search .................. 310/87; 318/793, 794, 318/795

[56] References Cited

U.S. PATENT DOCUMENTS

| | | | |
|---|---|---|---|
| 2,539,048 | 1/1951 | Arutunoff | 310/87 |
| 2,997,609 | 8/1961 | Lung | 310/87 |
| 3,457,866 | 7/1969 | Komor | 310/87 |
| 3,761,750 | 9/1973 | Green | 310/87 |
| 4,387,313 | 6/1983 | Yamamoto et al. | 310/87 |

*Primary Examiner*—David Smith, Jr.
*Attorney, Agent, or Firm*—Oblon, Fisher, Spivak, McClelland & Maier

[57] ABSTRACT

A new assembly for a capacitor-run submersible motor-pump. The assembly has a built-in starting capacitor and a built-in switch associated with the starting capacitor. A running capacitor is located external to the assembly. With this arrangement, the assembly has only four terminals including a ground terminal connected to the frame of the motor. Thus, a four-conductor cable, i.e. the most commonly used cable, can be used to connect the assembly to an electric distribution panel. The switch is preferably of a centrifugal type triggered at a predetermined speed of the motor to cut the starting capacitor out of the circuit. The assembly is as compact as a conventional capacitor-start motor assembly.

1 Claim, 3 Drawing Figures

CAPACITOR-RUN DRY TYPE SUBMERSIBLE MOTOR ASSEMBLY WITH A BUILT-IN STARTING CAPACITOR

FIELD OF THE INVENTION

The present invention relates to a dry type capacitor-start and run motor (often referred to as "capacitor-run") for use with a submersible pump.

BACKGROUND OF THE INVENTION

The above-mentioned motor pump employ two different capacitors, with one for starting the motors and the other for operation. Motors of this type (capacitor-run motors) have a good performance during both starting and running, and are usually used to drive a relatively big load (typically of 1.5 KW or more), while capacitor-start motors handle a relatively small load (typicall of 0.75 KW or less).

In the prior art, both the starting capacitor and running capacitor are located external to the motor-pump assembly (typically in a power distribution panel) because if they were built into the motor-pump assembly, this would require an impractically large space because of the physical sizes of the capacitors. Additionally, such a prior art arrangement usually employs an external trip switch in the form of a current relay or a timer which controls the starting capacitor. A switch of this type, however, does not always provide an optimal switching or tripping point at which the starting capacitor is released or disconnected from the associated winding of the motor, because it operates depending on parameters (i.e. current or time) other than those which are directly related to the actual torque required by the load and, therefore, the switching point is subject to variations due to fluctuations in supplied voltage. A premature disconnection of the start capacitor will not put the motor into operation but into "locked" state, resulting in possible damage thereto.

One way to get rid of this problem is to use a centrifugal switch which is mounted on the drive shaft of the motor and operates at a predetermined rotational speed of the motor for opening the starting capacitor. However, the use of such an internal switch requires an additional conductor to connect the internal switch with the external starting capacitor. This means that the cable connecting the panel and the motor assembly is of a five conductor type which is not readily available but normally needs to be ordered from a cable maker.

SUMMARY OF THE INVENTION

In accordance with the present invention, there is provided an assembly for a capacitor-run submersible dry motor which comprises input terminals adapted to receive single phase electric power, a main winding coupled to the input terminals, an auxiliary winding operatively coupled to the input terminals, a starting capacitor contained in the assembly and connected to one of the input terminals for introducing an advanced phase of power to the auxiliary winding, a switch contained in the assembly for connecting the starting capacitor to the auxiliary winding during starting of the motor, and an additional input terminal adapted to be coupled to an external running capacitor and coupled to the auxiliary winding for supplying an advanced phase of power from the running capacitor to the auxiliary winding during the entire operation of the motor.

Preferably, the internal trip switch comprises a centrifugal switch mounted on the drive shaft of the motor and operable at a predetermined rotational speed of the motor to cut the starting capacitor from the auxiliary winding.

Conveniently, a four-conductor cable, i.e. the most commonly used cable, may be connected to the terminals of the assembly, which consist of a pair of single phase terminals: a terminal to be connected to an external running capacitor and a terminal to be grounded.

Accordingly, an object of the present invention is to provide an assembly for a capacitor-run single phase submersible dry motor which obviates the problems discussed in the background to the invention.

Another object of the present invention is to provide an assembly which is as compact as that of a conventional capacitor-start submersible motor.

A further object of the present invention is to provide an assembly having a reduced number of terminals adapted to be connected to a multi-conductor cable which is readily available.

Still another object of the present invention is to provide a motor assembly the operation of which is immune to fluctuations in the supplied voltage.

BRIEF DESCRIPTION OF THE DRAWINGS

The above and other objects, features and advantages will be apparent as the description proceeds in conjunction with the accompanied drawings in which.

DETAILED DESCRIPTION OF THE PREFERRED EMBODIMENT

Figure 1:
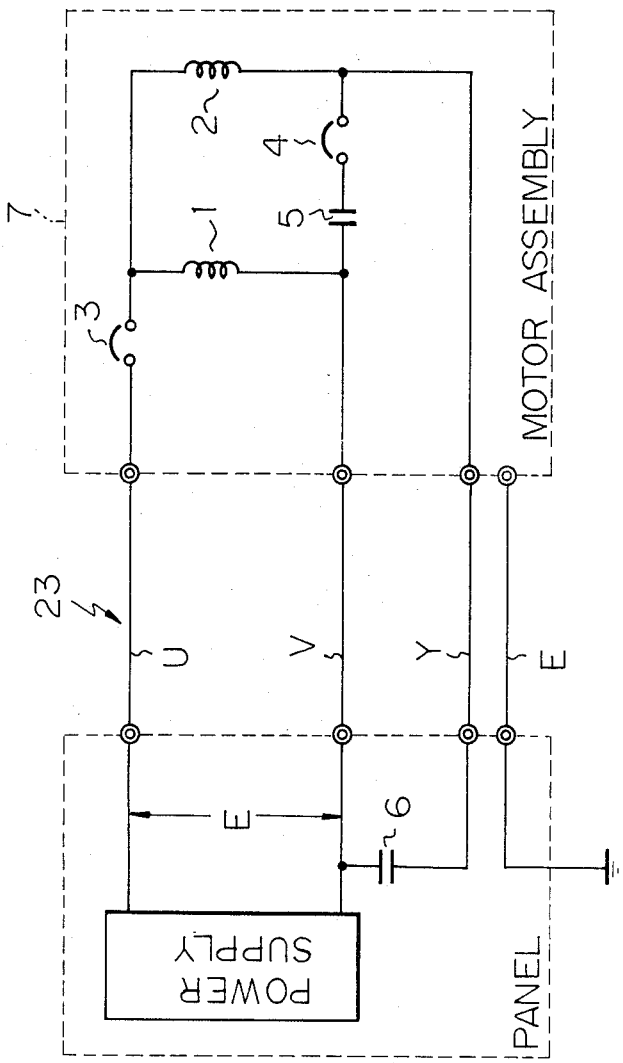
FIG. 1 shows a circuit diagram of a capacitor-run submersible motor assembly in accordance with the present invention and an panel connected thereto.

Referring first to FIG. 1, there is shown a circuit diagram of a capacitor-run submersible dry type motor-pump assembly generally designated by a reference numeral 7. A panel includes a suitable single phase power supply which selectively energizes the motor via a cable 23. The power supply may comprise a switch in the form of, for example, an electromagnetic type having contacts which are controlled by, for example, level sensors (not shown) associated with the submersible pump to control the latter.

The motor includes windings comprising a main winding 1 adapted to be energized with single phase power from the power supply in the panel and an auxiliary winding 2 adapted to be energized with an advanced phase of power relative to that of the power supplied to the main winding 1. The assembly includes a thermal protector 3 which protects the motor against dangerous overheating due to overload or failure to start.

In accordance with the present invention, the assembly comprises a built-in starting capacitor 5 and a built-in trip switch 4, both of which are connected in series with the auxiliary winding 2 to energize the latter with an advanced phase of power to produce the starting torque required during starting of the motor. The trip switch 4 may preferably comprise a centrifugal switch which cuts the start capacitor 5 out of the circuit when the motor approaches full speed.

In accordance with the present invention, a running capacitor 6 is located external to the assembly (in the present example, it is built into the panel). The running capacitor 6 supplies an advanced phase of power to the auxiliary winding 2 during the whole operation of the motor.

The cable 23 connecting the panel with the assembly may conveniently be of a four-conductor type. In the illustrated embodiment, first and second conductors U and V connect the power supply in the panel with the main winding 1 of the motor. A third conductor Y connects one end of the running capacitor 6 in the panel with one end of the auxiliary winding 2 of the motor. A fourth conductor E connects a terminal connected to the motor frame to a panel terminal which is grounded.

The starting capacitor 5 may be of the electrolytic type, while the running capacitor 6 may be of the metallized polypropylene film type.

In general, the starting capacitor 5 has a capacitance several times (typically four or five times) greater than that of the running capacitor 6. Nevertheless, the physical dimension of the latter is much greater than the former because the running capacitor must meet the "continuous" ratings required. Incorporation of the starting capacitor 5 into the motor assembly is, therefore, accomplished simply by providing a reasonably small additional space, while external location of the running capacitor is environmentally suitable for preventing overheating of the capacitor.

Figure 2:
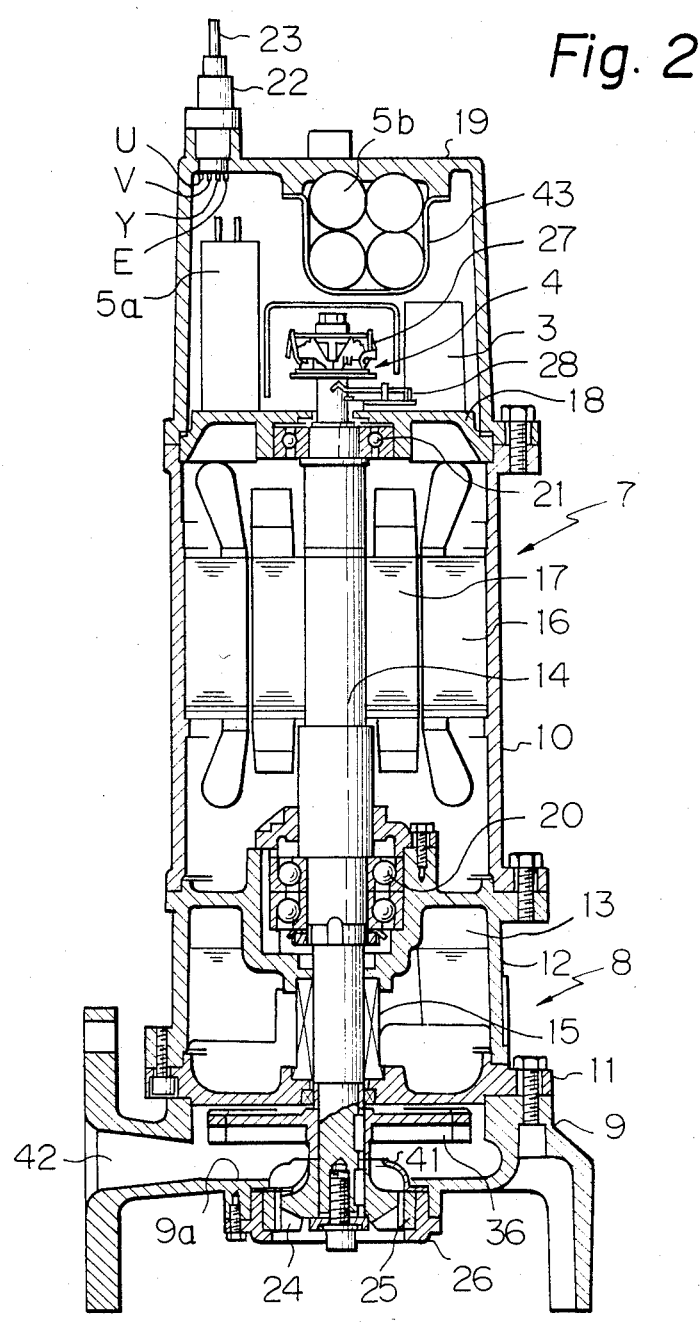
FIG. 2 is a vertical and partially sectional view of the submersible motor pump assembly in accordance with the present invention.

Referring to FIG. 2, there is shown a vertical section view of the submersible motor-pump assembly in accordance with the present invention. The illustrated assembly comprises a upper part which constitutes a container 19 for enclosing various circuit components, a middle part which constitutes a submersible motor 7 and a lower part which constitutes a submersible pump 8. The pump part 8 includes a lower casing 9 having an inlet 41 and an outlet for fluid. Secured on the lower casing 9 is an intermediate casing 11 on which an upper pump casing 12 is secured in a fluid-tight manner. A oil compartment 13 is formed by the intermediate casing and the upper casing 12. A drive shaft 14 extends through the center of the compartment 13. A mechanical seal 15 is provided on the shaft to provide a leak-proof seal between the rotating surface of the shaft and the compartment 13.

The lower pump casing 9 comprises an impeller 36 of the single shroud (front shroud free) type which is keyed on the drive shaft. The impeller front is sufficiently separated from the bottom surface 9a of the casing 9.

Also mounted on the drive shaft 14 is a grinder impeller 24 which is located below the main impeller 36. The grinder impeller 24 has cutting members at the periphery thereof which cooperate with cutting edges formed at the inner circumference of a grinder ring 25 so as to cut and grind foreign pieces contained in entered liquid, such as waste thread, straw and metal pieces. The grinder ring 25 is fit into an inlet cover 26 which is secured on the casing 9. The liquid processed by the grinder passes to the main impeller through a guide 41.

The drive shaft 14 extends through the axis of the motor frame 10 secured to the upper pump casing 12 in a fluid-tight fashion, and is supported by a lower bearing 20 mounted on the pump casing 12 and an upper bearing 21 mounted on a plate 18 which is fitted to the motor frame and secured by an upper cover 19.

A motor rotor 17 is mounted on the drive shaft 14 and faces a stator 17 secured to the motor frame 10 and having the main and auxiliary winding wound thereon.

The upper casing 19 is fluid-tightly secured to the motor frame 10 and constitutes a container for various circuit components. More specifically, a cable 23 is introduced to the inside of the container through a fluid-tight connector 22. A starting capacitor unit 5a is mounted on the plate 18. Other starting capacitor units 5b are supported by a U shaped hanger 43 secured on the upper cover 19.

Figure 3:
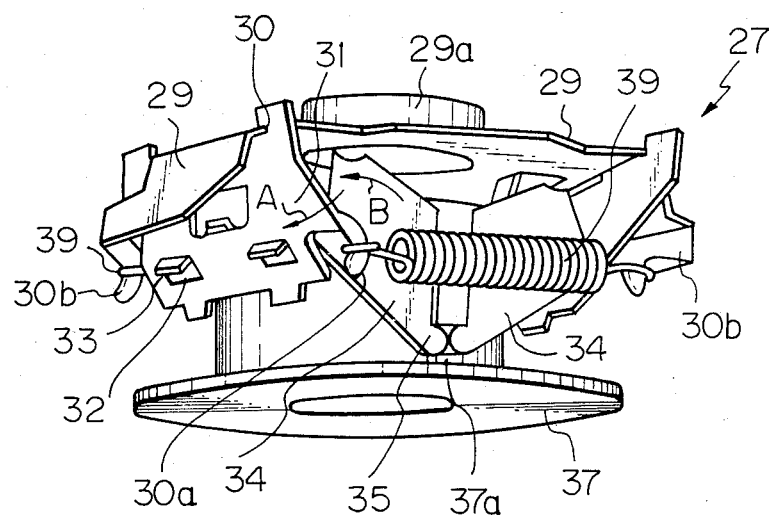
FIG. 3 is a view of a part of the centrifugal switch used in FIG. 2.

Also mounted on the plate 18 are the thermal protector 3 and an actuator 28 of the centrifugal switch 4. The actuator 28 includes contacts which are selectively closed or opened by a driver 27 mounted on the upper end of the drive shaft 14. More specifically, and referring to FIG. 3, the driver 27 includes a boss 29a secured on the drive shaft 14 (not shown in FIG. 3) and a base 29 integral with the boss 29a. A pair of symmetrical levers 31 are pivotally mounted on opposite sides of the base 29 by means of cutouts 30 formed therein.

Each lever has openings 32 which receive and engage protrusions 33 of a corresponding shifter 34 in such a way that the shifter 34 will pivot about the protrusions in engagement with the lever openings. Each shifter 34 has an inner end 35 in engagement with a groove 37a formed on a sleeve 37 slidable along the axial direction of the drive shaft 14. A pair of springs 39 (only one is shown; the other is missing from FIG. 3) are suspended between an arm 30a of the lever and an arm 30b of the base 29.

Rotation of the drive shaft 14 causes rotation of the boss and the base 29. Thus, the levers 31 will swing outwardly about the points 30 along an arrow A by a centrifugal force applied thereto. The shifters which are pivotally supported by the levers will shift outwardly and upwardly along an arrow B by the action of levers against the bias of the springs 39. Thus the inner ends 35 of the shifters fit in the groove 37a of the sleeve and apply a force to the upper wall of the groove, thus lifting the sleeve.

When the motor reaches a predetermined speed, the sleeve 37 of the driver 27 is sufficiently shifted upwardly and will no longer press the movable member of the actuator 18, thus opening the associated contacts, resulting in cutting the starting capacitor 5 out of the circuit.

While the present invention has been described with respect to the illustrated preferred embodiment, various modifications and alternations can be made without departing from the scope of the invention as defined in the appended claims.

What is claimed is:

1. An assembly for a capacitor-run submersible dry motor comprising:
   first and second input terminals adapted to receive single phase electric power;
   a main winding connected between said first and second input terminals;
   an auxiliary winding, a first end of which is connected to said first input terminal;
   a starting capacitor contained in said assembly, a first end of which is connected to said second input terminal for introducing an advanced phase of power into said auxiliary winding;
   a centrifugal switch contained in said assembly and connected between a second end of said starting capacitor and a second end of said auxiliary winding;

means for maintaining said centrifugal switch closed during starting of the motor;

means for opening said centrifugal switch when the motor has reached a predetermined speed;

a third input termnal adapted to be connected to a first end of a running capacitor located in an electric distribution panel external to said assembly, said third input terminal being connected to said second end of said auxiliary winding for supply an advanced phase of power from said running capacitor during the entire operation of the motor, said second input terminal being adapted to be connected to a second end of said running capacitor; and a fourth terminal connected to the frame of the motor for connecting said frame to ground at said panel, all of said four terminals being adapted to be connected to a four-conductor cable for connecting said assembly to said panel.

* * * * *